United States Patent [19]
Ozaki et al.

[11] Patent Number: 5,270,155
[45] Date of Patent: Dec. 14, 1993

[54] DYE DIFFUSION TRANSFER TYPE HEAT DEVELOPABLE COLOR LIGHT-SENSITIVE MATERIAL

[75] Inventors: Hiroyuki Ozaki; Hiroshi Arakatsu; Toru Harada, all of Kanagawa, Japan

[73] Assignee: Fuji Photo Film Co. Ltd., Kanagawa, Japan

[21] Appl. No.: 766,309

[22] Filed: Sep. 27, 1991

[30] Foreign Application Priority Data

Sep. 28, 1990 [JP] Japan ................... 2-258926
Dec. 19, 1990 [JP] Japan ................... 2-411619

[51] Int. Cl.$^5$ .................. G03C 5/54; G03C 1/84; G03C 7/20; G03C 5/16
[52] U.S. Cl. .................... 430/505; 430/203; 430/217; 430/220; 430/507; 430/508; 430/944
[58] Field of Search ............. 430/203, 220, 217, 507, 430/508, 944, 505, 522

[56] References Cited

U.S. PATENT DOCUMENTS

| | | | |
|---|---|---|---|
| 2,895,955 | 7/1959 | Heseltine et al. | 430/522 |
| 4,619,892 | 10/1986 | Simpson et al. | 430/220 |
| 4,882,265 | 11/1989 | Laganis et al. | 430/522 |

FOREIGN PATENT DOCUMENTS

| | | |
|---|---|---|
| 0183528 | 6/1986 | European Pat. Off. |
| 0385496 | 9/1990 | European Pat. Off. |
| 927329 | 5/1963 | United Kingdom |

*Primary Examiner*—Richard L. Schilling
*Attorney, Agent, or Firm*—Sughrue, Mion, Zinn Macpeak & Seas

[57] ABSTRACT

A dye diffusion transfer type heat developable color light-sensitive material is described including a support having thereon at least three light-sensitive layers containing, in combination, silver halide emulsions which are sensitive in different spectral regions from one another and dye providing compounds capable of releasing or forming diffusible dyes having different hues from one another, wherein the material has an exposure side which is subjected to incident light from a light source, wherein at least two layers of the at least three light-sensitive layers include a first light-sensitive layer containing an emulsion spectrally sensitized to a part of infrared rays and a second light-sensitive layer which is positioned on the exposure side nearer to the light source than is the first light-sensitive layer and contains an emulsion spectrally sensitized to a part of infrared rays having a wavelength shorter than that of the infrared rays applied to the emulsion of the first light-sensitive layer, and the first light-sensitive layer contains a non-transferring filter dye which absorbs at least a part of light to which the second light-sensitive layer is exposed, and wherein the light-sensitive layer or layers other than the first and second light-sensitive layers can be arranged in any order.

14 Claims, No Drawings

DYE DIFFUSION TRANSFER TYPE HEAT DEVELOPABLE COLOR LIGHT-SENSITIVE MATERIAL

FIELD OF THE INVENTION

This invention relates to a dye diffusion transfer type heat developable color light-sensitive material, and more particularly to a dye diffusion transfer type heat developable color light-sensitive material which gives a color image when at least two light-sensitive layers are exposed to infrared rays having different wavelengths.

BACKGROUND OF THE INVENTION

Heat developable color light-sensitive materials are known. Heat developable color light-sensitive materials and heat development process are described in *Research Disclosure* (May, 1978), pp. 54–58 (RD-16966) and U.S. Pat. Nos. 3,985,655, 4,463,079, 4,474,867, 4,478,927, 4,507,380, 4,500,626 and 4,483,914. Among them, dye diffusion transfer type heat developable color light-sensitive materials are preferred wherein a dye providing compound capable of releasing or forming a diffusible dye by heat development is used in combination with silver halide emulsions, and the diffusible dye is transferred to an image receiving element during or after heat development, because a dye image can be obtained in a short period of time and unexposed silver halides and other components can be separated from the dye image.

Laser diodes emitting radiations in the region of near infrared to infrared rays have been developed, and many image forming methods using the same have been proposed with the reduction in the cost of the diodes in recent years. Some of the methods have been put to practical use.

Generally, silver halide emulsions are not sensitive to infrared rays, so when silver halide photographic materials are used in image forming methods using the above-described light source, the silver halide emulsions must be spectrally sensitized by sensitizing dyes.

However, silver halides spectrally sensitized with the sensitizing dyes have a tendency in which the lowering in sensitivity from a wavelength giving the maximum sensitivity to a shorter wavelength is small as the wavelength in the spectral sensitization region becomes longer. This tendency is particularly remarkable with silver halide emulsions spectrally sensitized to the infrared region [for example, see Akira Sasai, *Photographic Chemistry*, Shashin Kogyo Shuppansha (1982), page 116, FIG. 9.5]. Therefore, in the preparation of infrared-sensitive light-sensitive materials, the problem which needs to be solved is that a light-sensitive layer for longer wavelengths is exposed to a light source for the exposure of a light-sensitive layer for shorter wavelengths, and as a result, a diffusible dye is formed in both layers. Namely, the problem of a lowering in color separation must be solved.

A means for solving this problem is keeping the spectral sensitization wavelength regions of light-sensitive layers having a spectral sensitivity in the infrared region separated from each other. On the other hand, the laser diodes which are frequently used are the laser diodes in the wavelength region of 750 to 850 nm, which are inexpensive and produced in many different types. Although there are laser diodes in the region of longer wavelengths, there is difficulty in conducting spectral sensitization in the region of such longer wavelengths, and problems of low sensitivity and high fog are caused. Accordingly, a method for improving color separation for a difference in wavelength by 100 nm at most is needed.

In color light-sensitive materials having light sensitivity in the visible region, filter layers are commonly used as a means for improving color separation. U.S. Pat. No. 4,619,892 discloses that the filter layer is applied to a color light-sensitive material having light sensitivity in the infrared region. This art discloses a color light-sensitive material wherein a filter layer is provided between a first infrared-sensitive layer and a second infrared-sensitive layer having sensitivity to shorter wavelengths than that of the first layer, the filter layer absorbing infrared rays which overlap with the maximum sensitivity region of the second infrared-sensitive layer without absorbing more than 40% of infrared rays to which the first infrared-sensitive layer is sensitized.

To carry out sufficient color separation with such a filter layer, it is necessary to develop an infrared dye having very sharp spectral characteristics. Further, a dye previously dispersed by emulsification and dispersion or solid dispersion must be prepared. Thus, production costs are greatly increased.

Further, when a reflective support (paper or resin-coated paper) is used as a support, it is necessary that in addition to the infrared dye, an irradiation-preventing dye which absorbs infrared rays to which a light-sensitive layer spectrally sensitized to the infrared region of the longest wavelength is exposed is contained in the light-sensitive layer, or an anti-halation layer containing such a dye is provided under the light-sensitive layer. Accordingly, costs are further increased.

SUMMARY OF THE INVENTION

Accordingly, an object of the present invention is to provide a dye diffusion transfer type heat developable color light-sensitive material which is excellent in color separation, which can be obtained at low production costs, and which gives a color image when at least two layers are exposed to infrared rays having a wavelength of not shorter than 700 nm.

The above-described object of the present invention has been achieved by providing a dye diffusion transfer type heat developable color light-sensitive material comprising a support having thereon at least three light-sensitive layers containing, in combination, silver halide emulsions which are sensitive in different spectral regions from one another and dye providing compounds capable of releasing or forming diffusible dyes having different hues from one another, wherein the material has an exposure side which is subjected to incident light from a light source, wherein at least two layers of the at least three light-sensitive layers comprise a first light-sensitive layer containing an emulsion spectrally sensitized to a part of infrared rays and a second light-sensitive layer which is positioned on the exposure side nearer to the light source than is the first light-sensitive layer and contains an emulsion spectrally sensitized to a part of infrared rays having a wavelength shorter than that of the infrared rays applied to the emulsion of the first light-sensitive layer, and the first light-sensitive layer contains a non-transferring filter dye which absorbs at least a part of light to which the second light-sensitive layer is exposed, and wherein the light-sensitive layer or layers other than the first and second light-sensitive layers can be arranged in any order.

DETAILED DESCRIPTION OF THE INVENTION

In the present invention, the "light-sensitive layer containing a silver halide emulsion and a dye providing compound in combination" as used herein refers not only to a layer containing a silver halide emulsion as well as a dye providing compound, but also to two adjoining layers comprising a silver halide emulsion layer and a dye providing compound-containing layer.

An advantage of the present invention obtained by adding a filter dye to the first light-sensitive layer (the emulsion layer of the first light-sensitive layer when the silver halide emulsion and the dye providing compound are added to separate layers) is that irradiation as well as halation can be prevented by choosing the filter dye so as to allow at least a part of light for exposing the light-sensitive layer to be absorbed. Further, there is the advantage that a margin of choice of the dyes can be widened, because dyes having a somewhat broader absorption region can be used. When the filter dye is used for the purpose of preventing both irradiation and halation, the dye density required therefor varies depending on the intensity of halation from the support, but it is preferred that when a conventional paper support is used, the dye density is set so that the transmittance of light for exposing the light-sensitive layer is from 5 to 50%. When the dye density is set to the above value, the lowering in the sensitivity of the light-sensitive layer (not the maximum spectral sensitivity, but the overall sensitivity of the layer) is 0.3 log E to 1.0 log E. It is more preferred that the dye density is set so that a lowering in the sensitivity of said light-sensitive layer becomes 0.4 log E to 0.8 log E.

The arrangement of layers is illustrated below.

In the present invention, the light-sensitive layer or layers other than the first and second light-sensitive layers may be arranged in any order. However, when a light-sensitive layer to be exposed to light in the region of wavelengths to be absorbed by the filter dye is present, it is preferred for the purpose of preventing sensitivity from being lowered that said light-sensitive layer is arranged on the exposure side nearer to the light source than is the first light-sensitive layer. From this point of view, it is preferred that the first light-sensitive layer is so arranged that it is farthest away from the side to be exposed (the exposure side). When exposure cannot be carried out from the side of a support as in paper support, it is preferred that the first light-sensitive layer is provided on the side nearest the support.

Any of nondiffusible filter dyes can be used in the present invention, so long as the dyes can absorb at least a part of light to which the second light-sensitive layer is exposed and the dyes as colored by heat development do not cause diffusion transfer. Binders for the nondiffusible filter dyes in the present invention are hydrophilic binders. The dyes can be made nondiffusible, for example, by bonding a ballast group (a hydrophilic group having many carbon atoms known in the field of photographic couplers) to a dye molecule, bonding two or more dye molecules through a bonding group which does not have a significant effect on the absorption characteristics of the dyes, or bonding a dye molecule through a covalent bond to a high-molecular binder such as gelatin used in photographic materials. Further, the dyes can be used in the form of polymers. Furthermore, the dyes may be used by introducing a mechanism for causing color to disappear by heat during heat development or pH.

Examples of the structures of color matrixes of the filter dyes include azo dyes, azomethine dyes (e.g., indophenol dyes), polymethine dyes (e.g., cyanine dyes, oxonol dyes, merocyanine dyes), azaanulene dyes (e.g., porphyrin dyes, phthalocyanine dyes, naphthalocyanine dyes), quinone dyes (e.g., naphthoquinone dyes, anthraquinone dyes), and various heavy metal complexes. The amounts of the dyes to be used can be decreased with an increase in extinction coefficient per unit weight. Accordingly, polymethine dyes and azaanulene dyes are preferred because the dyes have a high molecular extinction coefficient.

Among them, cyanine dyes represented by the following formula (A) are preferred because the dyes have a high molecular extinction coefficient and a narrow margin of the absorption band thereof, are stable, and do not have an adverse effect photographically:

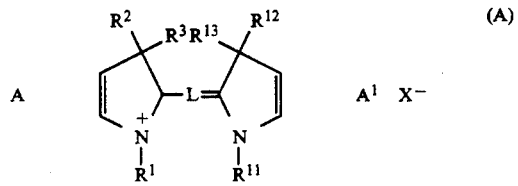
(A)

wherein A and $A^1$ independently represent an atomic group required for forming an unsubstituted or substituted benzene or naphthalene ring; L represents a trivalent bonding group which is formed by bonding from 5 to 7 unsubstituted or substituted methylene groups through conjugated double bonds; $R^1$ and $R^{11}$ independently represent an unsubstituted or substituted alkyl group having from 1 to 22 carbon atoms; $R^2$, $R^3$, $R^{12}$, and $R^{13}$ independently represent an alkyl group having from 1 to 22 carbon atoms; X represents an anion for neutralizing electric charge; at least one of $R^1$ and $R^{11}$ has at least 6 carbon atoms; and X can form an intramolecular salt together with A, $A^1$, $R^1$, $R^{11}$, $R^2$, $R^{12}$, $R^3$, or $R^{13}$ Among the compounds represented by formula (A), preferred compounds are compounds where A and $A^1$ each represent an unsubstituted benzene or naphthalene ring, and L is a group represented by the following formula (a), (b), (c) or (d):

(a)

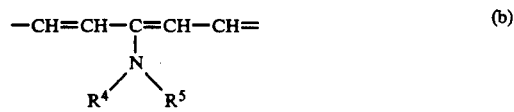
(b)

wherein $R^4$ and $R^5$ independently represent an unsubstituted or substituted alkyl or a phenyl group, or $R^4$ and $R^5$ can be combined together to form a ring, such as a pyrazine ring, a morpholine ring, or a piperidine ring;

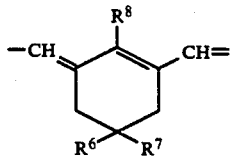

wherein $R^6$ and $R^7$ independently represent an unsubstituted or substituted alkyl group, a phenyl group, or a hydrogen atom; and $R^8$ represents a hydrogen atom or a halogen atom; and

wherein $R^9$ represents an unsubstituted or substituted alkyl group, a phenyl group, a halogen atom, or a hydrogen atom.

$R^1$ and $R^{11}$ are preferably an alkyl group having from 6 to 22 carbon atoms which may be substituted. Examples of substituent groups include a halogen atom, an alkoxy group, an aryloxy group, an alkoxycarbonyl group, an acyloxy group, and an aryl group. $R^2$, $R^{12}$, $R^3$, and $R^{13}$ each preferably represent a methyl group or an ethyl group. X is an anion such as a halide ion (e.g., chloride ion, bromide ion, iodide ion), a sulfonate ion (e.g., methanesulfonate ion, p-toluenesulfonate ion, p-chlorobenzenesulfonate ion, benzenesulfonate ion), a sulfate ion, a perchlorate ion, a hexafluorophosphate ion, or a tetrafluoroborate ion.

Among the compounds of formula (A), particularly preferred compounds are compounds where A and $A^1$ each represent an unsubstituted benzene ring, L is a group represented by formula (a), $R^1$ and $R^{11}$ each represent an unsubstituted or alkoxy group-substituted alkyl group having from 6 to 18 carbon atoms, $R^2$, $R^{12}$, $R^3$, and $R^{13}$ each represent a methyl group, and X represents a sulfonate ion, a sulfate ion, a perchlorate ion, a hexafluorophosphate ion, or a tetrafluoroborate ion.

Examples of the nondiffusible filter dyes which can be used in the present invention include, but are not limited to, are the following compounds.

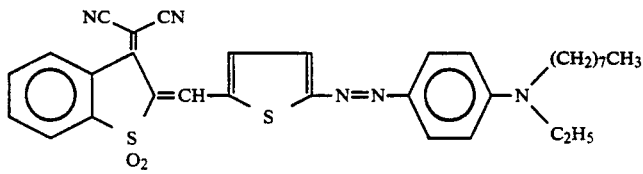

(1)

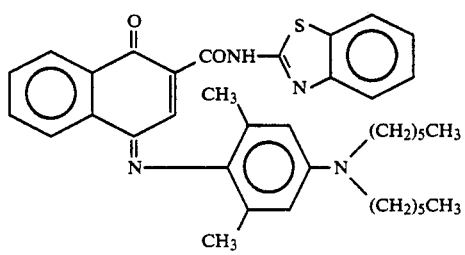

(2)

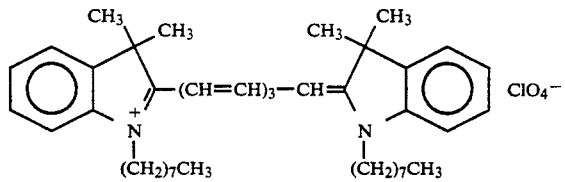

(3)

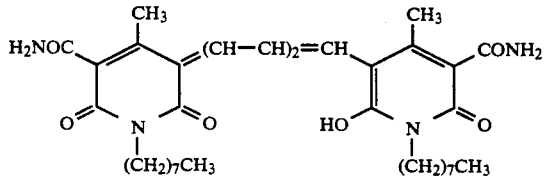

(4)

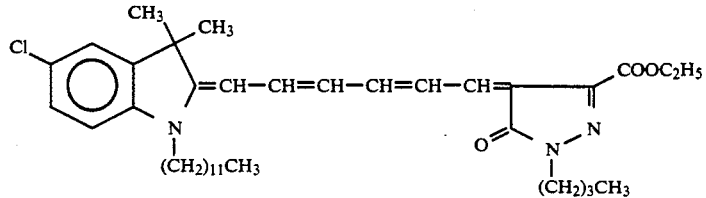

(5)

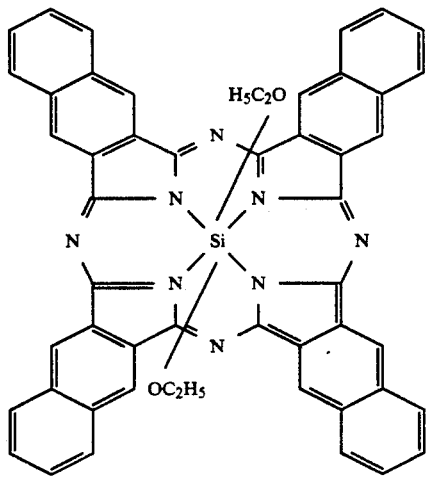
(6)
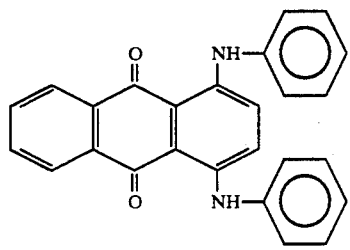
(7)
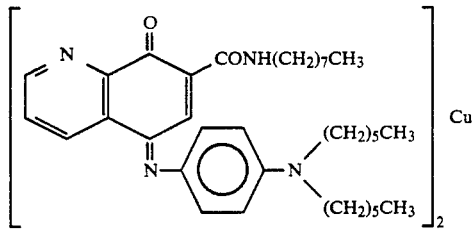
(8)
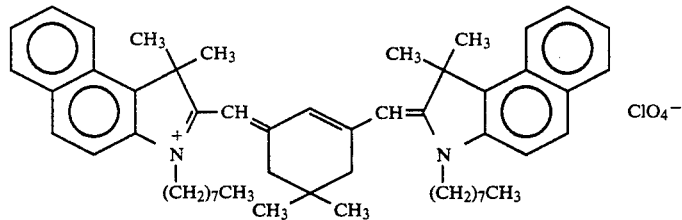
(9)
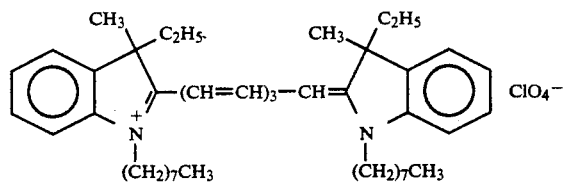
(10)
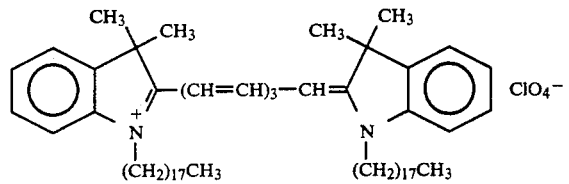
(11)

-continued

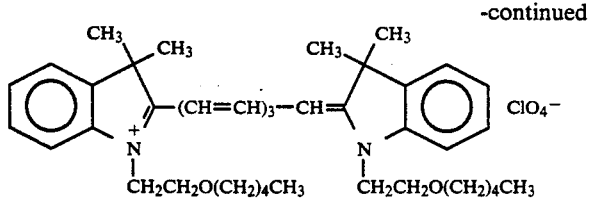 (12)

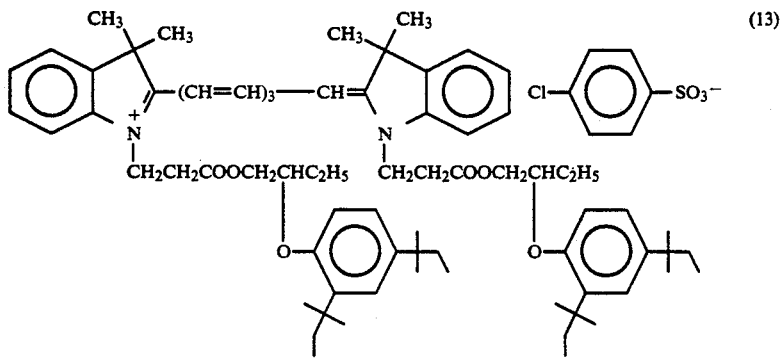 (13)

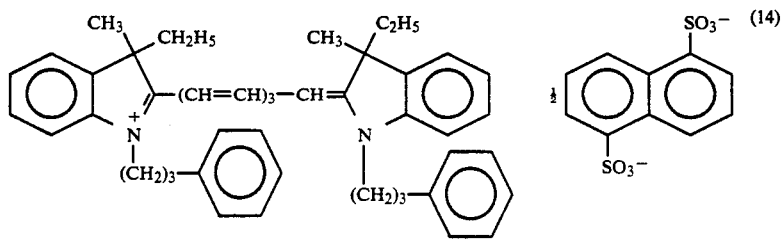 (14)

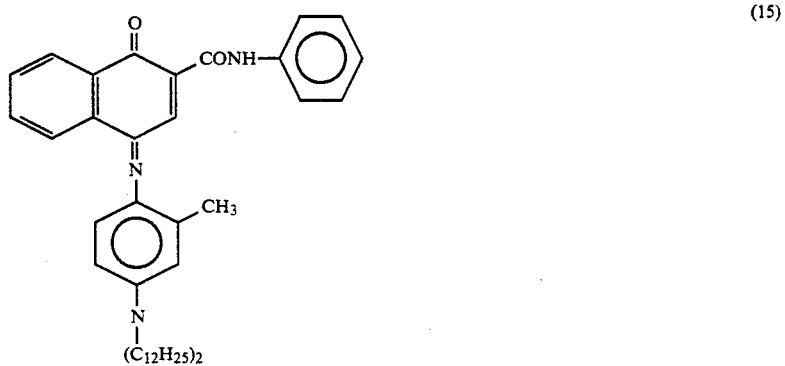 (15)

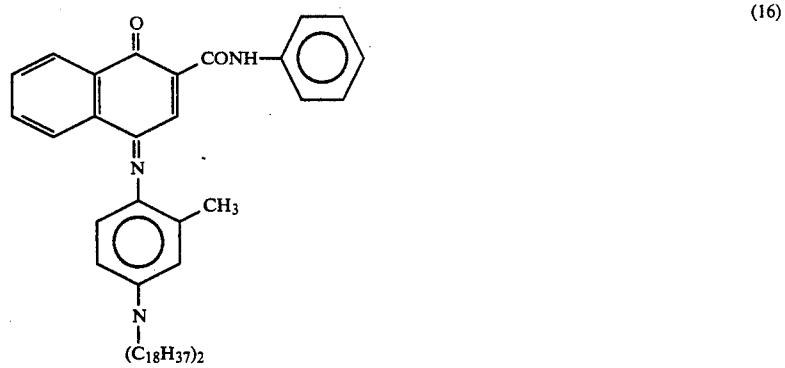 (16)

The filter dyes can be incorporated in light-sensitive materials by conventional methods, such as solid dispersion methods, emulsification and dispersion methods, etc. When other materials are to be added in the same layer by solid dispersion methods or emulsification and dispersion methods, production costs can be reduced by dispersing the materials together with the dyes in the same manner.

In another embodiment of the present invention, it is preferred for the purpose of further improving color separation that a heat developable color light-sensitive material has at least one light-sensitive layer (A) having a peak spectral sensitivity to light having a wavelength of 750±30 nm and at least one light-sensitive layer (B) which is provided above the light-sensitive layer (A) (the layer (B) is provided nearer to the exposure side than the layer (A)) and has a peak spectral sensitivity to light having a wavelength of 670±30 nm, wherein at least one cyan dye providing compound is contained in the light-sensitive layer (A) and/or a layer interposed between the light-sensitive layer (A) and the light-sensitive layer (B).

The above embodiment is illustrated in more detail below.

With respect to the above-described three light-sensitive layers and the peak wavelength of spectral sensitivity thereof, they are referred to hereinafter as light-sensitive layer (B) (670 nm), light-sensitive layer (A) (750 nm), and light-sensitive layer (C) (810 nm), respectively, for purposes of convenience.

The cyan dye providing compound itself forms a cyan color and is a compound capable of releasing a diffusible cyan dye by heat development, and thus the compound can be used as a filter dye.

Namely, the layer arrangement exemplified above is such that the light-sensitive layer (A) (750 nm) containing a cyan dye providing compound and the light-sensitive layer (B) (670 nm) containing a magenta dye providing compound are provided nearer to the incident light, source than the light-sensitive layer (C) (810 nm) containing a yellow dye providing compound, the light-sensitive layer (B) being provided nearer to the incident light source than the light-sensitive layer (A).

Cyan dye providing compounds exhibit absorption in the region of about 550 of 700 nm, so when the cyan dye providing compound is contained in the light-sensitive layer (A) (750 nm), spectral sensitivity to light of 670 nm in the light-sensitive layer (A) (750 nm) can be lowered, and a magenta dye image to be originally formed by exposure to light of 670 nm can be prevented from being mixed with cyan color.

Namely, color separation between the light-sensitive layers (A) and (B) can be achieved.

Accordingly, it is desirable that with respect to the spectral absorption of the cyan dye providing compounds, the compounds exhibit absorption in the region of 670±30 nm and scarcely show absorption in the region of 780 nm or above.

Further, when the light-sensitive layer (B) (670 nm) is provided above the light-sensitive layer (A) (750 nm) containing at least one cyan dye providing compound (the layer (B) is provided nearer to the exposure side than the layer (A)), the light-sensitive layer (B) (670 nm) benefits from the antihalation effect caused by the cyan dye providing compound, which has absorption nearly at 670 nm in the lower layer, whereby sharpness can be improved. The light-sensitive layer (B) does not have a filter effect on the cyan dye providing compound, and hence high sensitivity can be kept. Accordingly, there is an advantage in that the light-sensitive layer (A) need not to be subjected to extra processing to enhance sensitivity, and Dmin can be kept at a low value.

In a variation of the above-described embodiment, a magenta dye providing compound may be contained in the light-sensitive layer (C), and a yellow dye providing compound may be contained in the light-sensitive layer (B).

In another embodiment of the present invention, the layer arrangement is such that the light-sensitive layer (C) (810 nm) containing a cyan dye providing compound and the light-sensitive layer (B) (670 nm) containing a yellow (or magenta) dye providing compound are arranged nearer to incident light than the light-sensitive layer (A) (750 nm) containing a magenta (or yellow) dye providing compound. A similar effect to that described above can be obtained by this embodiment.

In each of the above-described embodiments, the maximum spectral sensitivity of the third light-sensitive layer (C) is set to light having a wavelength of 810 nm. However, when light has a wavelength of within 810±30 nm, there is no problem with respect to the effect of the present invention.

Light-sensitive silver halide and the dye providing compound are often added to the same layer. However, they can be added to separate layers, so long as they are reactive with each other. For example, when a colored dye providing compound is present in a layer under the silver halide emulsion layer, a decrease in sensitivity can be prevented. It is preferred that a reducing agent is incorporated in the heat developable light-sensitive material. However, the reducing agent may be supplied from an external source, for example, by a method wherein the reducing agent is diffused from a dye fixing material as described hereinafter. If desired, each light-sensitive layer (emulsion layer) may be composed of two or more layers (e.g., a high-sensitivity layer and a low-sensitivity layer).

The heat developable light-sensitive material may be provided with various auxiliary layers such as protective layers, subbing layers, interlayers, yellow filter layers, antihalation layers, and back layers.

Any of silver chloride, silver bromide, silver iodobromide, silver chlorobromide, silver chloroiodide, and silver chloroiodobromide can be used as silver halide in the present invention.

Silver halide emulsions used in the present invention may be any of a surface latent image type emulsion and an internal latent image type emulsion. The internal latent image type emulsion can be used as a direct reversal emulsion in combination with a nucleating agent and a light fogging agent. Alternatively, the silver halide emulsion may be a core/shell type emulsion in which the interior and surface of the grain are different in phase from each other. The silver halide emulsion may be a monodisperse or polydisperse emulsion, or it may be a mixture of monodisperse emulsions. The grain size of the grain is preferably in the range of from 0.1 to 2 μm, particularly preferably from 0.2 to 1.5 μm. The crystal habit of the silver halide grains may be cubic, octahedral, tetradecahedral, or tabular forms with a high aspect ratio.

Specifically, any of silver halide emulsions described in U.S. Pat. Nos. 4,500,626 (column 50) and 4,628,021, *Research Disclosure* (hereinafter abbreviated to RD), No. 17029 (1978), and JP-A-62-253159 (the term "JP-A" as used herein means an "unexamined published Japanese Patent Application") can be used.

The silver halide emulsions may be used in unripened form, but they are generally used after being chemically sensitized. For the sensitization of the emulsions for general light-sensitive materials, a conventional sulfur sensitization method, reduction sensitization method, noble metal sensitization method, or selenium sensitization method can be used singly or in combination. These chemical sensitization methods can be carried out in the presence of a nitrogen-containing heterocyclic compound (see JP-A-62-253159), if desired.

The amount of light-sensitive silver halide to be coated in the present invention is in the range of from 1 mg/m² to 10 g/m² in terms of silver.

In the present invention, organometallic salts as oxidizing agents can be used in combination with light-sensitive silver halide. Among such organometallic salts, organosilver salts are particularly preferred.

Examples of organic compounds which can be used for the formation of the organosilver salt oxidizing agents include benztriazole compounds, fatty acids, and other compounds described in U.S. Pat. No. 4,500,626 (columns 52 to 53). Further, silver salts of carboxylic acids having an alkynyl group, such as silver phenylpropiolate as described in JP-A-60-113235 and silver acetylide as described in JP-A-61-249044, are also useful. These organosilver salts may be used either alone or in combination of two or more.

The organosilver salts are used in an amount of from 0.01 to 10 mol, preferably from 0.01 to 1 mol, per mol of light-sensitive silver halide. The combined amount of the light-sensitive silver halide and the organosilver salt to be coated is preferably in the range of from 50 mg to 10 g/m2 in terms of silver.

Various anti-fogging agents and photographic stabilizers can be used in the present invention. Examples thereof include azoles and azaindenes described in RD 17643 (1978), pp. 24-25, nitrogen-containing carboxylic acids and phosphoric acids described in JP-A-59-168442, mercapto compounds and metal salts thereof described in JP-A-59-111636, and acetylene compounds described in JP-A-62-87957.

Silver halide used in the present invention may be spectrally sensitized with methine dyes or the like. Examples of dyes which can be used include cyanine dyes, merocyanine dyes, complex cyanine dyes, complex merocyanine dyes, holopolar cyanine dyes, hemicyanine dyes, styryl dyes, and hemioxonol dyes.

Specific examples thereof include sensitizing dyes described in U.S. Pat. No. 4,617,257, JP-A-59-180550, JP-A-60-140335, and RD 17029 (1978), pp. 12-13.

These sensitizing dyes may be used either alone or in combination. The combinations of sensitizing dyes are often used for the purpose of supersensitization.

In addition to the sensitizing dyes, the emulsions may contain a dye which itself does not have a spectral sensitization effect or a compound which does not substantially absorb visible light, but which exhibits a supersensitization effect (e.g., as described in U.S. Pat. No. 3,615,641 and JP-A-63-23145).

These sensitizing dyes may be added to the emulsions before, during, or after chemical ripening. Alternatively, the sensitizing dyes may be added before or after the nucleation of silver halide grains as described in U.S. Pat. Nos. 4,183,756 and 4,225,666. The amount of the dye to be added is generally in the range of from 10-8 to 10-2 mol per mol of silver halide.

Binders for use in the constituent layers of light-sensitive materials and dye fixing materials are preferably hydrophilic. Examples thereof include binders described in JP-A-62-253159 (pages 26-28). Specific examples of the binders include transparent or semi-transparent hydrophilic binders, such as proteins (e.g., gelatin and gelatin derivatives), natural compounds (e.g., polysaccharides, such as cellulose derivatives, starch, gum arabic, dextran, and pullulan), and synthetic high molecular compounds (e.g., polyvinyl alcohol, polyvinylpyrrolidone, acrylamide polymer). Further, highly water-absorbing polymers such as homopolymers of a vinyl monomer having a —COOM or —SO₃M group (wherein M is a hydrogen atom or an alkali metal) or copolymers of such vinyl monomers or such a vinyl monomer with another vinyl monomer (e.g., sodium methacrylate, ammonium methacrylate, Sumikagel 5H (manufactured by Sumitomo Chemical Co., Ltd.)) can be used. These binders may be used either alone or in combination of two or more.

In a system wherein heat development is carried out by feeding a very small amount of water, the absorption of water can be expedited by using the above-described highly water-absorbing polymer. When the highly water-absorbing polymer is contained in the dye fixing layer or the protective layer, the dye can be prevented from being re-transferred from the dye fixing material to the other material after transfer.

The binder is used in an amount of preferably not more than 20 g/m², more preferably not more than 10 g/m², still more preferably not more than 7 g/m².

The constituent layers (including the back layer) of the light-sensitive material or the dye fixing material may contain various polymer latexes to improve the physical properties of the layers, for example, to stabilize dimension or to prevent curling, sticking or cracking, or to prevent sensitizing or desensitizing by pressure. Specifically, any of the polymer latexes described in JP-A-62-245258, JP-A-62-136648, and JP-A-62-110066 can be used. Particularly, when a polymer latex having a low glass transition point (not higher than 40° C.) is used in a mordant layer, cracking in the mordant layer can be prevented. When a polymer latex having a high glass transition point is used in the back layer, curling can be prevented.

Any of reducing agents known in the field of the heat developable light-sensitive materials can be used in the present invention. Dye providing compounds having a reducing effect described hereinafter are also included within the reducing agents (in this case, other reducing agents can be used in combination therewith). Further, reducing agent precursors which themselves do not have a reducing effect, but which exhibit a reducing effect by the action of a nucleophilic reagent or heat during development, can be used.

Examples of the reducing agents which can be used in the present invention include reducing agents and reducing agent precursors described in U.S. Pat. Nos. 4,500,626 (columns 49 to 50), 4,483,914 (columns 30 to 31), 4,330,617 and 4,590,152, JP-A-60-140335 (pages 17 to 18), JP-A-57-40245, JP-A-56-138736, JP-A-59-178458, JP-A-59-53831, JP-A-59-182449, JP-A-59-182450, JP-A-60-119555, JP-A-60-128436 to JP-A-60-128439, JP-A-60-198540, JP-A-60-181742, JP-A-61-259253, JP-A-62-244044, JP-A-62-131253 to JP-A-62-131256 and European Pat. No. 220,746A2 (pp. 78-96).

Combinations of various reducing agents described in U.S. Pat. No. 3,039,869 can also be used.

When nondiffusible reducing agents are used, the nondiffusible reducing agents may be optionally used in combination with electron transfer agents and/or electron transfer agent precursors to accelerate electron transfer between the nondiffusible reducing agent and the developable silver halide.

The electron transfer agents or precursors thereof can be chosen from among the above-described reducing agents or precursors thereof. It is preferred that the electron transfer agents or precursors thereof have a higher transferability than that of the non-diffusible reducing agents (electron donors). Particularly useful electron transferring agents are 1-phenyl-3-pyrazolidones and aminophenols.

As the nondiffusible reducing agents (electron donors) which can be used in combination with the electron transfer agents, any of the above-described reducing agents may be used, so long as they do not substantially transfer through the layers of the light-sensitive material. Preferred examples of such electron donors include hydroquinones, sulfonamidophenols, sulfonamidonaphthols, compounds described in JP-A-53-110827, and dye providing compounds which are nondiffusible and have a reducing effect as described hereinafter. The amount of the reducing agent to be added is from 0.001 to 20 mol, preferably from 0.01 to 10 mol per mol of silver.

Dye providing compounds which are used in the present invention are compounds which form or release a mobile dye by a corresponding reaction or a counter-corresponding reaction when a silver ion is reduced to silver under high temperature conditions.

Examples of the dye providing compounds which can be used in the present invention include compounds (couplers) capable of forming a dye by an oxidative coupling reaction. The couplers may be any of the four equivalent type and two equivalent type couplers. Two equivalent type couplers which have a split-off group as a nondiffusible group and can form a diffusible dye by an oxidative coupling reaction can be preferably used. The nondiffusible group may be in the form of a polymer chain. Examples of color developing agents and couplers are fully described in T. H. James, *The Theory of the Photoggraphic Process*, fourth edition, pp. 291–334 and 354–361, JP-A-58-123533, JP-A-58-149046, JP-A-58-149047, JP-A-59-111148, JP-A-59-124399, JP-A-59-174835, JP-A-59-231539, JP-A-59-231540, JP-A-60-2950, JP-A-60-2951, JP-A-60-14242, JP-A-60-23474 and JP-A-60-66249.

Dye providing compounds of another type are compounds capable of releasing or diffusing imagewise a diffusible dye. The compounds of this type are represented by the following formula (LI):

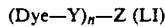

(Dye—Y)$_n$—Z (LI)

wherein Dye represents a dye group, a dye group Which has been temporarily shifted to a short wavelength region, or a dye precursor group; Y represents a simple bond or a bonding group; Z represents a group which causes a difference in the diffusibility of the compounds represented by (Dye—Y)$_n$—Z in corresponding or counter-corresponding to light-sensitive silver salt imagewise having a latent image, or which releases a dye to thereby cause a difference in the diffusibility between the released Dye and (Dye—Y)$_n$—Z; and n represents 1 or 2. When n is 2, two of (Dye-Y)'s may be the same or different.

Examples of the dye providing compounds of formula (LI) include the following compounds (1) to (5). The following compounds (1) to (3) are compounds which form a diffusible dye image (positive dye image) in counter-corresponding to the development of silver halide. The following compounds (4) and (5) are compounds which form a diffusible dye image (negative dye image) in corresponding to the development of silver halide.

(1) Dye developing agents comprising a hydroquinone developing agent bonded to a dye component described in U.S. Pat. Nos. 3,134,764, 3,362,819, 3,597,200, 3,544,545, and 3,482,972. These dye developing agents diffuse under alkaline conditions but become nondiffusible upon reaction with silver halide.

(2) Nondiffusible compounds which release a diffusible dye under alkaline conditions but lose their function upon reaction with silver halide as described in U.S. Pat. No. 4,503,137. Examples of such compounds include compounds which undergo intramolecular nucleophilic displacement reactions to release a diffusible dye as described in U.S. Pat. No. 3,980,479, and compounds which undergo an intramolecular rewinding reaction of the isooxazolone ring to release a diffusible dye as described in U.S. Pat. No. 4,199,354.

(3) Nondiffusible compounds that react with a reducing agent left unoxidized after being developed to release a diffusible dye as described in U.S. Pat. No. 4,559,290, European Pat. No. 220,746A2, U.S. Pat. No. 4,783,396, and Kokai Giho 87-6,199.

Examples of such compounds include compounds which undergo an intramolecular nucleophilic displacement reaction after being reduced to release a diffusible dye as described in U.S. Pat. Nos. 4,139,389 and 4,139,379, JP-A-59-185333, and JP-A-57-84453, compounds which undergo an intramolecular electron transfer reaction after being reduced to release a diffusible dye as described in U.S. Pat. No. 4,232,107, JP-A-59-101649, JP-A-61-88257, and Research Disclosure, No. 24025 (1984), compounds which undergo cleavage of a single bond after being reduced to release a diffusible dye as described in German Pat. No. 3,008,588A, JP-A-56-142530, and U.S. Pat. Nos. 4,343,893 and 4,619,884, nitro compounds which receive electrons to release a diffusible dye as described in U.S. Pat. No. 4,450,223, and compounds which receive electrons to release a diffusible dye as described in U.S. Pat. No. 4,609,610.

Preferred examples of such compounds include compounds having an N—X bond (wherein X represents an oxygen atom, sulfur atom, or nitrogen atom) and an electron attracting group per molecule as described in European Pat. No. 220,746A2, Kokai Giho 87-6,199, U.S. Pat. No. 4,783,396, JP-A-63-201653, and JP-A-63-201654, compounds having an SO$_2$—X group (wherein X is as defined above) and an electron attracting group per molecule as described in JP-A-1-26842, compounds having a PO—X bond (wherein X is as defined above) and an electron attracting group per molecule as described in JP-A-63-71344, and compounds having a C—X' bond (wherein X' is as defined above for X or is —SO$_2$—) and an electron attracting group per molecule as described JP-A-63-271341. Further, compounds which cause the cleavage of a single $\pi$-bond conjugated with an electron accepting group after being reduced to release a diffusible dye as described in JP-A-1-161237 and JP-A-1-161342 can be used.

Particularly preferred among these compounds are compounds having an N—X bond and an electron attracting group per molecule. Specific examples of such compounds include compounds (1) to (3), (7) to (10), (12), (13), (15), (23) to (26), (31), (32), (35), (36), (40), (41), (44); (53) to (59), (64), and (70) described in European Pat. No. 220,746A2, and compounds (11) to (23) described in Kokai Giho 87-6,199.

(4) Compounds (DDR couplers) which are couplers containing a diffusible dye as a split-off group and release a diffusible dye by the reaction thereof with oxidation products of reducing agents. Examples of such compounds include those described in U.K. Pat. No. 1,330,524, JP-B-48-39165 (the term "JP-B" as used herein means an "examined Japanese patent publication"), and U.S. Pat. Nos. 3,443,940, 4,474,867 and 4,483,914.

(5) Compounds (DRR compounds) which have the ability to reduce silver halide or organosilver salts and to release a diffusible dye when the reduction of the compounds to be reduced is effected. The compounds can be used without other reducing agents and thus the problem of image staining caused by the oxidative decomposition product of the reducing agent does not occur. Accordingly, the compounds can be preferably used. Typical examples of the compounds are described in U.S. Pat. Nos. 3,928,312, 4,053,312, 4,055,428, 4,336,322, 3,725,062, 3,728,113, 3,443,939, and 4,500,626, JP-A-59-65839, JP-A-59-69839, JP-A-53-3819, JP-A-51-104343, JP-A-59-116537, JP-A-57-179840, and RD No. 17465. Specific examples of DRR compounds include compounds described in the aforesaid U.S. Pat. No. 4,500,626 (columns 22 to 44). Among them, compounds (1) to (3), (10) to (13), (16) to (19), (28) to (30), (33) to (35), (38) to (40), and (42) to (64) are preferred. Further, compounds described in U.S. Pat. No. 4,639,408 (columns 37 to 39) are also useful.

In addition thereto, the above-described couplers can be used. Further, examples of suitable dye providing compounds other than the compounds of formula [LI] include dye silver compounds wherein an organo-silver salt and a dye are bonded to each other (*Research Disclosure*, pp. 54-58, May, 1978), azo dyes for use in a heat developable silver dye bleaching method (U.S. Pat. No. 4,235,957 and *Research Disclosure*, pp. 30-32 (April, 1976)), and leuco dyes (U.S. Pat. Nos. 3,985,565 and 4,022,617).

Hydrophobic additives such as dye providing compounds and nondiffusible reducing agents can be introduced into the layers of the light-sensitive material by conventional methods, such as a method described in U.S. Pat. No. 2,322,027. In this case, a high boiling organic solvent as described in JP-A-59-83154, JP-A-59-178451, JP-A-59-178452, JP-A-59-178453, JP-A-59-178454, JP-A-59-178455, and JP-A-59-178457 may optionally be used in combination with a low boiling organic solvent having a boiling point of from 50 to 160° C.

The amount of the high boiling organic solvent is generally not more than 10 g, preferably 5 g or less, per gram of the dye providing compound used, or 1 cc or less, preferably 0.5 cc or less, particularly preferably 0.3 cc or less, per gram of binder.

Dispersion methods using a polymer as described in JP-B-51-39853 and JP-A-51-59943 can be used.

If a compound which is substantially insoluble in water is used, it may be incorporated in the binder in the form of a dispersion of finely divided particles, rather than by the above described processes.

In order to disperse a hydrophobic compound in a hydrophilic colloid, various surface active agents can be used. Examples of such surface active agents which can be used in this dispersion process include those described as surface active agents in JP-A-59-157636 (pp. 37-38).

In the present invention, a compound which serves both to accelerate the development of light-sensitive materials and to stabilize images may be used. Specific examples of such compounds preferably used in the present invention are described in U.S. Pat. No. 4,500,626 (columns 51 to 52).

In a system where the diffusion transfer of a dye or dyes is used to form images, a dye fixing material is used in combination with the light-sensitive material. Such a dye fixing material may be either coated on a separate support from the light-sensitive material or coated on the same support as the light-sensitive material. For the relationship of the light-sensitive material with the dye fixing material, the support, and a white reflecting layer which can be used, those described in U.S. Pat. No. 4,500,626 (column 57) are useful.

The dye fixing material preferably used in the present invention has at least one layer containing a mordant and a binder. Mordants which are known in the field of photography may be used. Specific examples of such mordants include those described in U.S. Pat. No. 4,500,626 (columns 58 to 59), JP-A-61-88256 (pp. 32-41), JP-A-62-244043 and JP-A-62-244036. Alternatively, a dye receiving high molecular weight compound as described in U.S. Pat. No. 4,463,079 may be used.

The dye fixing material may optionally be provided with auxiliary layers such as a protective layer, a release layer, or an anti-curling layer. Particularly, a protective layer can be advantageously incorporated in the dye fixing material.

The constituent layers of the light-sensitive material and the dye fixing material may contain high boiling organic solvents as plasticizers, slip agents, or compounds to improve the release of the light-sensitive material from the dye fixing material. Specific examples of the high boiling organic solvents include those described in JP-A-62-253159 (page 25) and JP-A-62-245253.

For the above-described purposes, various silicone oils ranging from dimethyl silicone oil to modified silicone oils obtained by introducing various organic groups into dimethylsiloxane can be used. For example, various modified silicone oils, particularly carboxy-modified silicone (trade name: X-22-3710) described in "Modified Silicone Oil", technical data reported by Shin-Etsu Silicone Co., Ltd., can be effectively used.

Silicone oils described in JP-A-62-215953 and JP-A-63-46449 can also be effectively used.

The light-sensitive material or the dye fixing material may contain anti-fading agents. Examples of the anti-fading agents include antioxidants, ultraviolet light absorbers, and certain metal complexes.

Examples of suitable antioxidants include chroman compounds, coumaran compounds, phenol compounds (e.g., hindered phenols), hydroquinone derivatives, hindered amine derivatives, and spiroindane compounds. Other useful antioxidants include compounds as described in JP A-61-159644.

Examples of suitable ultraviolet absorbers include benzotriazole compounds as described in U.S. Pat. No. 3,533,794, 4-thiazolidone compounds as described in U.S. Pat. No. 3,352,681, benzophenone compounds as described in JP-A-46-2784, and compounds as described in JP-A-54-48535, JP-A-62-136641, and JP-A-61-88256. Other useful ultraviolet light absorbers include ultraviolet light-absorbing polymers as described in JP-A-62-260152.

Examples of suitable metal complexes include compounds as described in U.S. Pat. Nos. 4,241,155, 4,245,018 (columns 3 to 36), and 4,254,195 (columns 3 to 8), JP-A-62-174741, JP-A-61-88256 (pp. 27-29), JP-A-63-199248, JP-A-1-75568, and JP-A-1-74272.

Examples of other useful anti-fading agents are described in JP-A-62-215272 (pp. 125-137).

The anti-fading agents for preventing a dye transferred to the dye fixing material from being faded may be previously contained in the dye fixing material, or they may be supplied from an external source, such as the light-sensitive material, to the dye fixing material.

The above-described antioxidants, ultraviolet light adsorbers, and metal complexes may be used in combination.

The light-sensitive material or the dye fixing material may contain a fluorescent brightening agent. In particular, the fluorescent brightening agent may be incorporated in the dye fixing material or supplied to the dye fixing material from an external source, such as the light-sensitive material. Examples of such fluorescent brightening agents include compounds as described in K. Veenkataraman, *The Chemistry of Synthetic Dyes*, Vol. V, Chapter 8 and JP-A-61-143752. Specific examples of such compounds include stilbene compounds, coumarin compounds, biphenyl compounds, benzoxazolyl compounds, naphthalimide compounds, pyrazoline compounds, and carbostyryl compounds. The fluorescent brightening agent may be used in combination with the anti-fading agent.

Examples of hardening agents which may be incorporated in the constituent layers of the light-sensitive material or the dye fixing material include those described in U.S. Pat. No. 4,678,739 (column 41), JP-A-59-116655, JP-A-62-245261, and JP-A-61-18942. Specific examples of the hardening agents include aldehyde hardening agents (e.g., formaldehyde), aziridene hardening agents, epoxy hardening agents, vinylsulfone hardening agents (e.g., N,N-ethylenebis(vinylsulfonylacetamido)ethane), N-methylol hardening agents (e.g., dimethylolurea), and high molecular weight hardening agents (e.g., compounds as described in JP-A-62-234157).

The constituent layers of the light-sensitive material or the dye fixing layer may contain various surfactants as coating aids or as agents to improve releasability, to improve slipperiness, to impart antistatic properties, or to accelerate development. Examples of the surfactants are described in JP-A-62-73463 and JP-A-62-183457.

The constituent layers of the light-sensitive material or the dye fixing material may contain organofluoro compounds to improve slipperiness or releasability or to impart antistatic properties. Typical examples of organofluoro compounds include fluorine surface active agents as described in JP-B-57-9053 (columns 8 to 17), JP-A-61-20944, and JP-A-62-135826, and hydrophobic fluorine compounds such as oily fluorine compounds (e.g., fluorine oil) or solid fluorine compound resins (e.g., tetrafluoroethylene resin).

The light-sensitive material or the dye fixing material may contain matting agents. Examples of matting agents include compounds as described in JP-A-1-88256 (pp. 29) (e.g., silicon dioxide, polyolefin, polymethacrylate), and compounds as described in JP-A-3-274944 and JP-A-63-274952 (e.g., benzoguanamine resin beads, polycarbonate resin beads, AS resin beads).

Furthermore, the constituent layers of the light-sensitive material or dye fixing material may contain a heat solvent, an anti-foaming agent, an antibacterial and anti-fungal agent, or colloidal silica. Specific examples of these additives are described in JP-A-61-88256 (pp. 26-32).

In the present invention, the light-sensitive material or the dye fixing material may contain image formation accelerators. The image formation accelerators are capable of accelerating a redox reaction between a silver salt oxidizing agent and a reducing agent, accelerating a reaction for forming a dye from the dye providing material, decomposing a dye, releasing a diffusible dye, or accelerating the transfer of a dye from the light-sensitive material layer to the dye fixing layer. From a physical and chemical standpoint, image formation accelerators can be classified into various groups, such as a base or base precursor, nucleophilic compound, a high boiling organic solvent (oil), heat solvent, surface active agent, and compounds capable of interacting with silver or a silver ion. However, these groups normally have composite functions and therfore exhibit a combination of the above described accelerating effects. Details on the above are given in U.S. Pat. No. 4,678,730 (columns 38 to 40).

Examples of such base precursors include salts of an organic acid capable of being heat decarboxylated with a base, and compounds, which undergo an intramolecular molecular nucleophilic displacement reaction, Lossen rearrangement, or Beckman rearrangement to release an amine. Specific examples of such base precursors are described in U.S. Pat. No. 4,511,493 and JP-A-62-65038.

In a system where heat development and dye transfer are simultaneously effected in the presence of a small amount of water, such a base and/base precursor may be preferably incorporated in the dye fixing material to improve the storage stability of the light-sensitive material.

Other examples of suitable base precursors include a combination of a sparingly soluble metallic compound and a compound capable of complexing with metal ions contained in the metallic compound (complexing compound) as described in European Patent 210,660A, and a compound as described in JP-A-61-232451 which undergoes electrolysis to produce a base. Particularly, the former compound may be effectively used. The sparingly soluble metallic compound and the complexing compound may advantageously be incorporated separately in the light-sensitive material and the dye fixing material, respectively.

The light-sensitive material and/or the dye fixing material may contain various development stopping agents to obtain a uniform image even when the processing temperature and time are changed during development.

The term "development stopping agent" as used herein means a compound which readily neutralizes or reacts with a base to reduce the base concentration in the layer to stop development, or a compound which interacts with silver or a silver salt to restrain development. Specific examples of such compounds include acid precursors which release an acid on heating, electrophilic compounds which undergo a displacement reaction with a base coexisting therewith on heating, nitrogen-containing heterocyclic compounds, mercapto compounds, and precursors thereof. Details on the above are disclosed in JP-A-62-253159 (pp. 31-32).

As a suitable support for the dye fixing material or light-sensitive material, a material capable of withstanding the processing temperature should be used. In general, paper or a synthetic high molecular weight compound (film) may be used. Specific examples of a support material which can be used in the present invention include films of polyethylene terephthalate, polycarbonates, polyvinyl chloride, polystyrene, polypropylene, polyimides, or celluloses (e.g., triacetylcellulose), film obtained by incorporating a pigment such as titanium oxide in the film, synthetic paper film formed of polypropylene or the like, a mixed paper made of synthetic resin pulp such as polyethylene and natural pulp, Yankee paper, baryta paper, coated paper (particularly cast coat paper), metals, fabrics, and glass.

The support materials may be used as such or in the form of a material laminated with a synthetic high molecular weight compound such as polyethylene on one or both sides thereof. Alternatively, a support material as described in JP-A-62-253159 (pp. 29-31) may be used in the present invention.

The surfaces of these support materials may be coated with a hydrophilic binder, a semiconducting metal oxide such as alumina sol or tin oxide, carbon black, or other antistatic agents. Supports obtained by using paper as a substrate are preferred in the present invention.

Methods for exposing the light-sensitive material and recording an image include a method wherein scenery or persons are directly photographed by using a camera, a method wherein the light-sensitive material is exposed through a reversal film or a negative film by using a printer or an enlarger, a method wherein the original picture is subjected to scanning exposure through slits by using the exposure device of a copying machine, a method wherein information on an image is converted into electric signals and exposure is conducted by light emitted from light-emitting diodes or various other light sources, and a method wherein information on an image is outputted to an image display device such as a CRT, liquid crystal display, electroluminescence display, or plasma display, and exposure is conducted directly or through an optical system.

Light sources for recording image on the light-sensitive material include natural light, a tungsten lamp, a light emitting diode, a laser, or a CRT described in U.S. Pat. No. 4,500,626 (column 56).

Image exposure can be conducted by using a wavelength transduction element comprising a combination of a non-linear optical material with a coherent light source such as laser beam. The term "non-linear optical material" as used herein refers to a material which exhibits non-linearity between polarization and an electric field, the polarization occurring when an intense photoelectric field, such as laser beam, is applied. Examples of such materials which can be preferably used include inorganic materials such as lithium niobate, potassium dihydrogenphosphate (KDP), lithium iodate, and $BaB_{24}$, urea derivatives, nitroaniline derivatives, nitropyridine-N-oxide derivatives such as 3-methyl-4-nitropyridine-N-oxide (POM), and compounds described in JP-A-61-53462 and JP-A-62-210432. As the wavelength transduction element, a single crystal light waveguide type element and a fiber type element are known, and any of them can be used.

Examples of the above-described information on an image include picture signals from a video camera, electron still camera, or the like, television signals according to the Nippon Television Signal Code (NTSC), picture signals obtained by dividing an original into many pixels by means of a scanner or the like, and picture signals produced by means of a CG, CAD, or like computer.

The light-sensitive material and/or the dye fixing material may be provided with an electrically conductive heating element layer as a heating means for heat development or the diffusion transfer of the dye. Transparent or opaque heating elements described in JP-A-61-145544 can be used. These electrically conductive layers function as antistatic layers. The heating temperature in the heat development is preferably in the range of from about 50° C. to about 250° C., particularly from about 80° C. to about 180° C.

The dye diffusion transfer process may be effected simultaneously with or after heat development. In the latter case, the heating temperature at which dye transfer can be effected is preferably in the range of from room temperature to the heating temperature in the heat development, particularly from 50° C. to a temperature about 10° C. lower than the heating temperature for heat development. The transfer of a dye can be effected by heating alone. In order to accelerate the dye transfer, a solvent may be used. Alternatively, a process as described in JP-A-59-218443 and JP-A-61-238056 which comprises heating the light-sensitive material in the presence of a small amount of a solvent, particularly water, to effect development and dye transfer simultaneously or in sequence may be effectively used. The heating temperature in this process is preferably in the range of from 50° C. to a temperature not higher than the boiling point of the solvent. For example, if the solvent is water, the heating temperature is preferably in the range of from 50° C. to 100° C.

Examples of solvents which ma be used to accelerate development and/or transfer the diffusible dye to the dye fixing layer include water and basic aqueous solutions containing an inorganic alkali metal salt or organic base as described with reference to the image formation accelerators. Other useful examples of solvents include low boiling solvents and a mixed solution of a low boiling solvent and water or a basic aqueous solution. Such solvents may further contain a surface active agent, anti-fogging agent, sparingly soluble metal salt, complexing compound, or the like.

These solvents may be incorporated in either or both of the light-sensitive material and the dye fixing material. The amount of the solvent incorporated in the light-sensitive material and/or dye fixing material may be small, such as not more than the weight of the solvent in a volume corresponding to the maximum swelling volume of the total coated films (particularly, not more than the value obtained by subtracting the weight of the entire coated film(s) from the weight of the solvent in a volume corresponding to the maximum swelling volume of the entire coated film(s)) in the light-sensitive or dye fixing solvent.

As methods for incorporating the solvent in the light-sensitive layer or the dye fixing layer, those described in JP-A-61-147244 (page 26) can be used. Alternatively, the solvent may be incorporated in either or both of the light-sensitive material and the dye fixing material in a microcapsule form or like form.

In order to accelerate transfer of a dye, hydrophilic heat solvents which are solid at normal temperature but dissolve at an elevated temperature may be incorporated in the light-sensitive material or the dye fixing material. Such hydrophilic heat solvents may be incorporated in either or both of the light-sensitive material and the dye fixing material. The layer in which the solvent is incorporated may be any one of an emulsion layer, interlayer, protective layer, and dye fixing layer, preferably the dye fixing layer and/or layers adjacent thereto. Examples of the hydrophilic heat solvents include ureas, pyridines, amides, sulfonamides, imides, anisoles, oximes, and other heterocyclic compounds. In order to accelerate the transfer of a dye, the high boiling organic solvent may be incorporated in the light-sensitive material and/or the dye fixing material.

Examples of heating methods in the development and/or the dye transfer step include a method which comprises bringing the light-sensitive material into contact with a heated block or plate, a method which comprises bringing the light-sensitive material into contact with a heating plate, hot presser, heat roller, halogen lamp heater, or infrared or far infrared lamp heater, and a method which comprises passing the light-sensitive material through a high temperature atmosphere.

Pressure conditions under which the light-sensitive material and the dye fixing material are brought into contact with each other and a method for applying pressure thereto are described in JP-A-61-47244 (page 27).

Any heat developing apparatus can be used for the photographic processing of the photographic elements of the present invention. Apparatus described in JP-A-9-75247, JP-A-59-177547, JP-A-59-181353, JP-A-60-18951, and JP-A-U-62-25944 (the term "JP-A-U" as used herein means an "unexamined published Japanese utility model application") can be preferably used.

The present invention is now illustrated in greater detail by reference to the following examples which, however, are not to be construed as limiting the invention in any way. All parts, percents, ratios, and the like are by weight, unless otherwise indicated.

EXAMPLE 1

The preparation of a silver halide emulsion (III) for the fifth layer of a light-sensitive material is illustrated below.

An aqueous solution of silver nitrate (100 g of silver nitrate was dissolved in water to make a total volume of 600 cc) and an aqueous halide solution (54.5 g of potassium bromide and 2 g of sodium chloride were dissolved in water to make a total volume of 600 cc) were simultaneously added to a well-stirred aqueous solution (50 g of gelatin, 10 g of sodium chloride, 0.1 g of potassium bromide, and 5 cc of sodium hydroxide (1N) were dissolved in 800 cc of water, and the temperature of the solution was kept at 60° C.) of lime-processed ossein gelatin (ash content: 0.4%, adenine content: 0.2 ppm) at such a rate that the entire amount of the aqueous solutions was added over a period of 30 minutes. After one minute from the completion of the addition, a dye solution obtained by dissolving 0.2 g of the following sensitizing dye A and 0.2 g of the following sensitizing dye B in 120 cc of water and 120 cc of methanol was added thereto. After 5 minutes, 10 cc of a 1% aqueous solution of potassium iodide was added thereto.

Sensitizing dye A

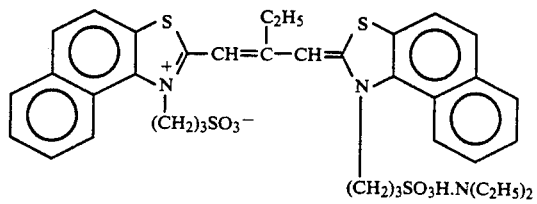

-continued

Sensitizing dye B

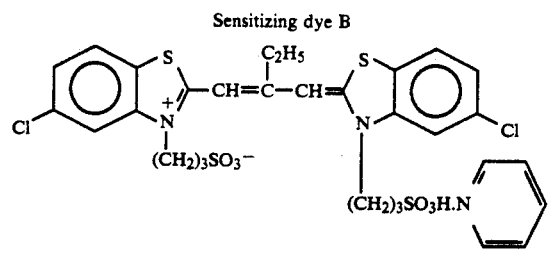

After the emulsion was washed with water and desalted, 10 g of lime-processed ossein gelatin and 50 cc of water were added thereto to adjust the pH to 6.0 and the pAg to 7.6. The temperature of the resulting emulsion was kept at 60° C., and chemical ripening was carried out for 50 minutes by using 2.5 mg of hypo. The yield of the emulsion was 500 g.

The preparation of a silver halide emulsion (II) for the third layer of a light-sensitive material is illustrated below.

An aqueous solution of silver nitrate (50 g of silver nitrate was dissolved in water to make a total volume of 300 cc) and an aqueous halide solution (22.8 g of potassium bromide and 6 g of sodium chloride were dissolved in water to make a total volume of 300 cc) were simultaneously added to a well-stirred aqueous gelatin solution (20 g of lime-processed deionized ossein gelatin (Ca content: 20 ppm), 4 g of sodium chloride, 0.1 g of potassium bromide and 0.015 g of the following reagent A were dissolved in 800 cc of water, and the temperature of the solution was kept at 65° C.) at such a rate that the entire amount of the solutions was added over a period of 30 minutes.

Reagent A

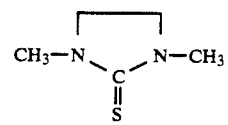

The temperature of the solution was lowered to 35° C., and an aqueous solution of silver nitrate (50 g of silver nitrate was dissolved in water to make a total volume of 300 cc) and an aqueous halide solution (31.5 g of potassium bromide and 1.7 g of sodium chloride were dissolved in water to make a total volume of 300 cc) were simultaneously added thereto at such a rate that the entire amount of the solutions was added over a period of 30 minutes.

After the emulsion was washed with water and desalted, 25 g of lime-processed ossein gelatin (guanine content: 50 ppm) and 100 cc of water were added thereto to adjust the pH to 6.3 and the pAg to 7.9. The temperature of the resulting emulsion was kept at 55° C., and chemical ripening was carried out by using 0.8 mg of triethylthiourea and 100 mg of 4-hydroxy-6-methyl-1,3,3a,7-tetrazaindene. The yield of the emulsion was 650 g.

The preparation of a silver halide emulsion (I) for the first layer of a light-sensitive material is illustrated below.

The following solution I and the following solution II were simultaneously added to a well-stirred aqueous solution (20 g of gelatin, 2 g of sodium chloride and 0.015 g of the above-described reagent A were dissolved in 800 cc of water, and the temperature of the solution was kept at 50° C.) of lime-processed ossein gelatin (Ca content: 2500 ppm) at such a rate that the solution I was added over a period of 12 minutes, and the solution II was added over a period of 8 minutes. After a lapse of 16 minutes from the completion of the addition of the solution I, the following solution IV was added thereto over a period of 44 minutes. After a lapse of 20 minutes from the completion of the addition of the solution I, the following solution III was added thereto over a period of 40 minutes. The pAg of the mixture was 6.7 during the period from the completion of the addition of the solution I to the initiation of the addition of the solution III.

Solution I

This solution was obtained by dissolving 15 g of silver nitrate in water to make a total volume of 100 cc.

Solution II

This solution was obtained by dissolving 4.9 g of potassium bromide and 1 g of sodium chloride in water to make a total volume of 60 cc.

Solution III

This solution was obtained by dissolving 85 g of silver nitrate in water to make a total volume of 500 cc.

Solution IV

This solution was obtained by dissolving 44.1 g of potassium bromide and 9 g of sodium chloride in water to make a total volume of 540 cc.

After the emulsion was washed with water and desalted, 25 g of lime-processed ossein gelatin (Ca content: 4000 ppm) and 100 cc of water were added to adjust the pH to 6.0 and the pAg to 7.7. The temperature of the resulting emulsion was kept at 55° C., and chemical ripening was carried out by using 1.1 mg of triethylurea and 60 mg of 4-hydroxy-6-methyl-1,3,3a,7-tetrazaindene. The yield of the emulsion was 650 g.

The preparation of organosilver salts for use in a light-sensitive material is illustrated below. Organosilver salt (1)

After 28 g of gelatin was dissolved in 1500 cc of water, a solution of 6.6 g of benztriazole dissolved in 12.7 cc of methanol was added thereto. The resulting solution was stirred while keeping the temperature of the solution at 40° C. A solution of 8.5 g of silver nitrate dissolved in 120 cc of water was added to the above solution over a period of 2 minutes. Further, a solution of 6.6 g of benztriazole dissolved in 12.7 cc of methanol and 46.5 cc of 2N sodium hydroxide were added thereto. Subsequently, a solution of 8.5 g of silver nitrate in 1700 cc of water was added thereto over a period of 6 minutes.

The pH of the solution was adjusted to thereby precipitate a benztriazole silver emulsion. An excess of the salt was removed. The pH was adjusted to 6.30 to obtain 420 g of a benztriazole silver emulsion.

Organosilver salt (2)

12.8 g of potassium 4-acetylaminopropiolate and 136 cc of a 10% aqueous solution of the following surfactant (0) were dissolved in 540 cc of ethanol and 1600 cc of water. The mixture was mixed and stirred while keeping the temperature thereof at 40° C.

Surfactant (O)

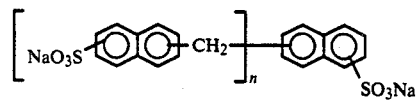

n = 4 to 5

To the solution was added a solution of 8 g of silver nitrate dissolved in 120 cc of water over a period of 3 minutes. Water was added to the resulting dispersion, and ultrafiltration purification was carried out so as to give a washing desalting efficiency of about 1/11. An aqueous dispersion was obtained (yield: 500 g). Further, 14 g of gelatin and 96 cc of water were added thereto, and the mixture was stirred at a high speed to disperse the gelatin and water. A dispersion of the organosilver salt (2) was obtained (yield: 610 g).

The preparation of a dispersion of a dye providing compound in gelatin for use in a light-sensitive material is illustrated below.

15 g of a yellow dye providing compound (A), 1.2 g of the reducing agent shown below, 0.3 g of a mercapto compound (1), 1.5 g of a surfactant (4), and 7.5 g of a high boiling organic solvent (1) were weighed, and 45 cc of ethyl acetate was added thereto. The mixture was dissolved with heating at about 60° C. to obtain a uniform solution. The solution, 100 g of a 10% aqueous solution of lime-processed gelatin, and 30 cc of water were mixed with stirring and dispersed in a homogenizer at 10,000 rpm for 10 minutes. The resulting dispersion was referred to as the dispersion (1) of yellow dye providing compound.

15 g of a magenta dye providing compound (B), 0.6 g of the reducing agent shown below, 0.15 g of a mercapto compound (1), 1.5 g of a surfactant (4), and 5.3 g of a high boiling organic solvent (2) were weighed, and 25 cc of ethyl acetate was added thereto. The mixture was dissolved with heating at about 60° C. to obtain a uniform solution. The solution, 100 g of a 10% aqueous solution of lime-processed gelatin, and 30 cc of water were mixed with stirring and dispersed in a homogenizer at 10,000 rpm for 10 minutes. The resulting dispersion was referred to as the dispersion of magenta dye providing compound.

15 g of a cyan dye providing compound (C), 0.8 g of the reducing agent shown below, 0.6 g of a mercapto compound (1), 1.5 g of a surfactant (4), and 8.3 g of a high boiling organic solvent (1) were weighed, and 30 cc of ethyl acetate was added thereto. The mixture was dissolved with heating at about 60° C. to obtain a uniform solution. The solution, 100 g of a 10% aqueous solution of lime-processed gelatin, and 30 cc of water were mixed with stirring and dispersed in a homogenizer at 10,000 rpm for 10 minutes. The resulting dispersion was referred to as the dispersion of cyan dye providing compound.

A dye diffusion transfer type heat developable color light-sensitive material 100 having the following structure was prepared by using the above-described emulsions and dispersions. Numerals on the right represent coating weights in g/m².

Heat developable color light-sensitive material 100

-continued

(Comparative Example)

| | |
|---|---|
| Sixth layer (Protective layer) | |
| Gelatin | 1.1 |
| Matting agent | 0.36 |
| Surfactant (1) | $6.4 \times 10^{-2}$ |
| Surfactant (2) | 0.11 |
| Surfactant (3) | $3.6 \times 10^{-2}$ |
| Water-soluble polymer | $1.6 \times 10^{-3}$ |
| Hardening agent | 0.061 |
| Fifth layer [Red-sensitive light-sensitive layer (670 nm)] | |
| Silver halide emulsion (III) (in terms of silver) | 0.22 |
| Organosilver salt (1) (in terms of silver) | $4.8 \times 10^{-3}$ |
| Organosilver salt (2) (in terms of silver) | $2.0 \times 10^{-2}$ |
| Acetylene compound | $4.6 \times 10^{-3}$ |
| Magenta dye providing compound (B) | 0.29 |
| High boiling organic solvent (2) | 0.10 |
| Reducing agent | $1.2 \times 10^{-2}$ |
| Mercapto compound (1) | $2.9 \times 10^{-3}$ |
| Surfactant (4) | $2.9 \times 10^{-2}$ |
| Gelatin | 0.34 |
| Water-soluble polymer | $9.3 \times 10^{-3}$ |
| Surfactant (5) | $2.8 \times 10^{-2}$ |
| Fourth layer (Interlayer) | |
| Gelatin | 0.71 |
| Zinc hydroxide | 0.22 |
| Surfactant (1) | $1.1 \times 10^{-2}$ |
| Surfactant (5) | $5.8 \times 10^{-2}$ |
| Water-soluble polymer | $1.5 \times 10^{-2}$ |
| Third layer [Near infrared light-sensitive layer (750 nm)] | |
| Silver halide emulsion (II) (in terms of silver) | 0.31 |
| Benztriazole | $4.3 \times 10^{-4}$ |
| Sensitizing dye (1) | $8.7 \times 10^{-5}$ |
| Cyan dye providing compound (C) | 0.34 |
| High boiling organic solvent (1) | 0.19 |
| Reducing agent | $1.8 \times 10^{-2}$ |
| Mercapto compound (1) | $1.4 \times 10^{-2}$ |
| Surfactant (4) | $3.4 \times 10^{-2}$ |
| Gelatin | 0.63 |
| Second layer (Interlayer) | |
| Gelatin | 0.77 |
| Zinc hydroxide | 0.22 |
| Surfactant (1) | $7.4 \times 10^{-3}$ |
| Surfactant (5) | $4.0 \times 10^{-3}$ |
| Surfactant (6) | $7.1 \times 10^{-2}$ |
| Water-soluble polymer | $5.7 \times 10^{-3}$ |
| First layer [Infrared light-sensitive layer (810 nm)] | |
| Silver halide emulsion (I) (in terms of silver) | 0.28 |
| Organosilver salt (1) (in terms of silver) | $4.6 \times 10^{-2}$ |
| Organosilver salt (2) (in terms of silver) | $2.3 \times 10^{-2}$ |
| Mercapto compound (2) | $1.1 \times 10^{-3}$ |
| Sensitizing dye (2) | $5.7 \times 10^{-6}$ |
| Yellow dye providing compound (A) | 0.34 |
| High boiling organic solvent (1) | 0.17 |
| Reducing agent | $2.7 \times 10^{-2}$ |
| Mercapto compound (1) | $6.8 \times 10^{-3}$ |
| Surfactant (4) | $3.4 \times 10^{-2}$ |
| Surfactant (5) | $1.2 \times 10^{-2}$ |
| Gelatin | 0.50 |
| Water-soluble polymer | $2.0 \times 10^{-2}$ |
| Support | |
| (Neutral paper, polyethylene-laminated, thickness: 120 μm) | |

Yellow dye providing compound (A)

-continued
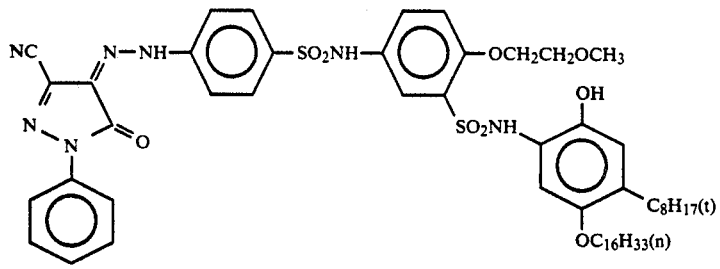
Magenta dye providing compound (B)
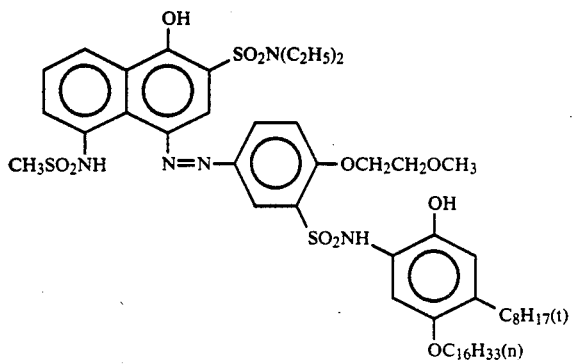
Cyan dye providing compound (C)
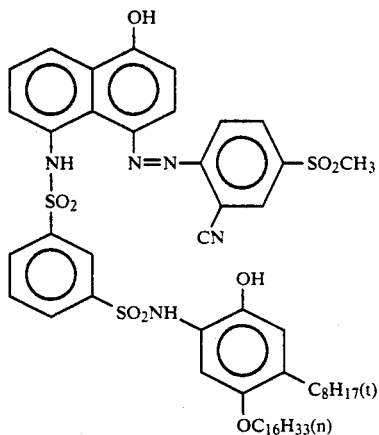
Water-soluble polymer
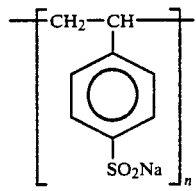
Surfactant (1) Aerosol OT (a product of American Cyanamid Co.)
Surfactant (2)
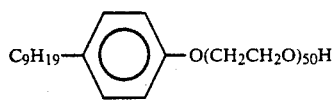
Surfactant (3)

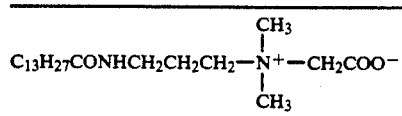
Surfactant (4)
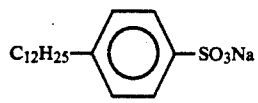
Surfactant (5)
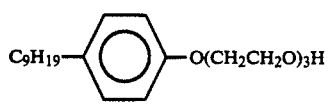
Surfactant (6)
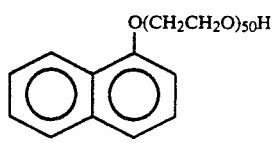
Hardening agent
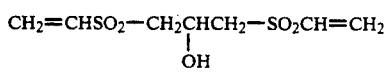
Sensitizing dye (1)
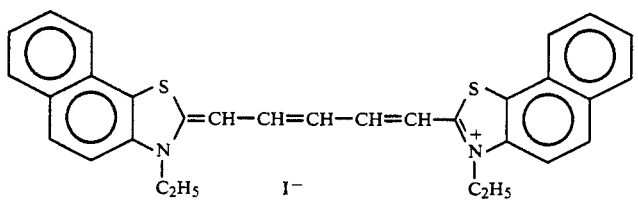
Sensitizing dye (2)
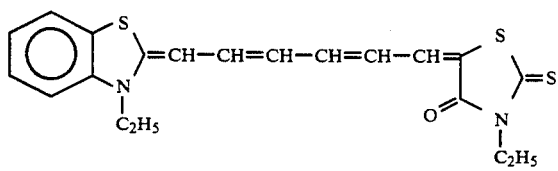
Acetylene compound
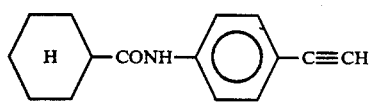
Reducing agent
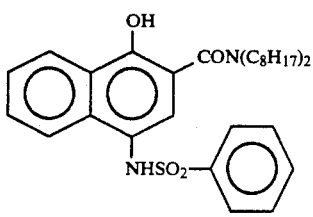
Mercapto compound (1)

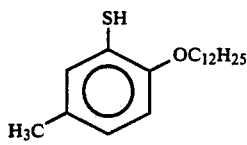

Mercapto compound (2)

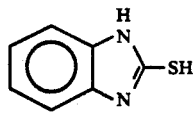

High boiling organic solvent (1): Triisononyl phosphate
High boiling organic solvent (2): Trihexyl phosphate
Matting agent: Silca gel ($SiO_2.H_2O$) having an average particle size of 4 μm The preparation of a dye fixing material is illustrated below.

The following layers were coated on a polyethylene-laminated paper support to prepare a dye fixing material R-1. Numerals on the right represent coating weights in g/m².

| Third layer | |
|---|---|
| Gelatin | 0.05 |
| Silicone oil *1 | 0.04 |
| Surfactant *2 | 0.001 |
| Surfactant *3 | 0.02 |
| Surfactant *4 | 0.1 |
| Picolinic acid guanidine | 0.45 |
| Polymer *5 | 0.24 |
| Second layer | |
| Mordant *6 | 2.35 |
| Polymer *7 | 0.60 |
| Gelatin | 1.40 |
| Polymer *5 | 0.21 |
| High boiling organic solvent *8 | 1.40 |
| Picolinic acid guanidine | 1.80 |
| Surfactant *2 | 0.02 |
| First layer | |
| Gelatin | 0.45 |
| Surfactant *4 | 0.01 |
| Polymer *5 | 0.04 |
| Hardening agent *9 | 0.30 |
| Support | |
| (Polyethylene-laminated paper support 170 μm in thickness) | |
| First back layer | |
| Gelatin | 3.25 |
| Hardening agent *9 | 0.25 |
| Second back layer | |
| Gelatin | 0.44 |
| Silicone oil *1 | 0.08 |
| Surfactant *2 | 0.002 |
| Matting agent *10 | 0.09 |
| -continued | |
| Surfactant *11 | 0.01 |

Silicone oil *1

$$CH_3-SiO-(SiO)_{20}-(SiO)_{4}-Si-CH_3$$
(with CH₃, CH₃, CH₃, (CH₂)₃COOH, CH₃ side groups)

Surfactant *2 Aerosol OT (a product of American Cyanamid Co.)
Surfactant *3

$C_8F_{17}SO_2NCH_2COOK$ (with $C_3H_7$ on N)

Surfactant *4

$C_{11}H_{23}CONHCH_2CH_2CH_2-N^+(CH_3)_2-CH_2COO^-$

Surfactant *11

$C_8F_{17}SO_2N(CH_2CH_2O)_n(CH_2)_4SO_3Na$ (with $C_3H_7$ on N)
(n = about 4)

Polymer *5 Vinyl alcohol-sodium acrylate copolymer (75:25 by mol)
Polymer *7 Dextran (MW: 70,000)
Mordant *6

$-(CH_2-CH)_{40}-(CH_2-CH)_{30}-(CH_2-CH)_{10}-$
(with pyrazole, pyrrolidone=O, and phenyl-SO₂K side groups)

High boiling organic solvent *8: Reofos (a product of Ajinomoto Co., Inc.)
Hardening agent *9

$(CH_2)_4-(OCH_2-CH-CH_2)_2$ (with epoxide O)

Matting agent *10 Benzoquanamine resin (particles having a particle size of greater than 10μ accounting for 18 vol % of the whole particles)

The preparation of heat developable color light-sensitive materials 101 to 104 is illustrated below.

Heat developable color light-sensitive material 101
(Comparative Example)

1.8 g of filter dye (11), 1.5 g of surfactant (4) and 7.5 g of high boiling organic solvent (1) were weighed, and 45 cc of ethyl acetate was added thereto. The mixture was dissolved with heating at about 60° C. to obtain a uniform solution. The solution, 100 g of a 10% solution of lime-processed gelatin, and 30 cc of water were mixed with stirring and dispersed in a homogenizer at 10,000 rpm for 10 minutes. The resulting dispersion was referred to as the dispersion of filter dye.

A heat developable color light-sensitive material 101 was prepared in the same way as the heat developable color light-sensitive material 100, except that the dispersion of filter dye prepared above was added to the second layer (interlayer) in such an amount as to give a coating weight of 68 mg of filter dye per m².

Heat developable color light-sensitive material 102
(Invention Example)

15 g of yellow dye providing compound (A), 0.3 g of filter dye (11), 0.3 g of mercapto compound (1), 1.5 g of surfactant (4), and 7.5 g of high boiling organic solvent (1) were weighed, and 45 cc of ethyl acetate was added thereto. The mixture was dissolved with heating at about 60° C. to obtain a uniform solution. The solution, 100 g of a 10% aqueous solution of lime-processed gelatin, and 30 cc of water were mixed with stirring and dispersed in a homogenizer at 10,000 rpm for 10 minutes. The resulting dispersion was referred to as the dispersion (2) of yellow dye providing compound.

A heat developable color light-sensitive material 102 was prepared in the same way as the heat developable color light-sensitive material 100, except that the dispersion (2) of yellow dye providing compound prepared above was used in place of the dispersion (1) of yellow dye providing compound used in the first layer of the light-sensitive material 100, and the filter dye was added in such an amount as to give a coating weight of 68 mg/m².

Heat developable color light-sensitive material 103
(Invention Example)

15 g of yellow dye providing compound (A), 21.0 g of filter dye (15), 1.2 g of the reducing agent shown above, 0.3 g of mercapto compound (1), 1.5 g of surfactant (4), and 7.5 g of high boiling organic solvent (1) were weighed, and 45 cc of ethyl acetate was added thereto. The mixture was dissolved with heating at about 60° C. to obtain a uniform solution. The solution, 100 g of a 10% aqueous solution of lime-processed gelatin, and 30 cc of water were mixed with stirring and dispersed in a homogenizer at 10,000 for 10 minutes. The resulting dispersion was referred to as the dispersion (3) of yellow dye providing compound.

A heat developable color light-sensitive material 103 was prepared in the same way as the heat developable color light-sensitive material 100, except that the dispersion (3) of yellow dye providing compound prepared above wa used in place of the dispersion (1) of yellow dye providing compound used in the first layer of the light-sensitive material 100, and the filter dye was added in such an amount as to give a coating weight of 476 mg/m².

Heat developable color light-sensitive material 104
(Invention Example)

15 g of yellow dye providing compound (A), 27.9 g of filter dye (16), 1.2 g of the reducing agent shown above, 0.3 g of mercapto compound (1), 1.5 g of surfactant (4), and 7.5 g of high boiling organic solvent (1) were weighed, and 45 cc of ethyl acetate was added thereto. The mixture was dissolved with heating at about 60° C. to obtain a uniform solution. The solution, 100 g of a 10% aqueous solution of lime-processed gelatin, and 30 cc of water were mixed with stirring and dispersed in a homogenizer at 10,000 for 10 minutes. The resulting dispersion was referred to as the dispersion (4) of yellow dye providing compound.

A heat developable color light-sensitive material 104 was prepared in the same way as the heat developable color light-sensitive material 100, except that the dispersion (4) of yellow dye providing compound prepared above was used in place of the dispersion (1) of yellow dye providing compound used in the first layer of the light-sensitive material 100, and the filter dye was added in such an amount as to give a coating weight of 632 mg/m².

Measurement of degree of color separation

The heat developable color light-sensitive materials 100 to 104 were exposed under the conditions given in Table 1 by using the exposure apparatus described in JP-A-2-129625. Water in an amount of 12 cc/m² was applied to the surface layer of each of these light-sensitive materials. The light-sensitive material and the dye fixing material were brought into close contact with each other so as to allow the layer surfaces of both materials to be put upon each other. The laminate was heated at 93° C. for 25 seconds, and the materials were peeled off from each other.

TABLE 1

| Exposure Conditions of Laser Beam | |
| --- | --- |
| Beam intensity | 930 microwatt maximum (86 erg/cm²) |
| Density of scanning | 4000 dpi (16 rasters/mm) |
| Beam diameter | 100 ± 10 μm in the direction of main scanning |
| | 80 ± 10 μm in the direction of sub scanning |
| Exposure time | 0.9 msec/one raster; 5 to 180 nsec/one pixel |
| Wavelength of exposure | 750 nm (laser beam) |
| | 810 nm (laser beam) |
| Exposure pattern | Change of log E unit per 2.5 cm in the direction of sub scanning |
| Method for changing exposure amount: modulation of emission time | |

Each of the yellow density and the cyan density obtained on the dye fixing material was measured. When exposure of light having a wavelength of 810 nm was conducted, the relative sensitivity (Sy 1.0) of the yellow density at an exposure rate giving an optical density of 1.0 was determined. When exposure to light having a wavelength of 750 nm was conducted, the relative sensitivity (Sc 1.0) of the cyan density at an exposure rate giving an optical density of 1.0 was determined. When exposure to light having a wavelength of 750 nm was conducted, an exposure rate log Ec giving density of $(D_{max}-0.1)$ and an exposure rate log Ey giving a yellow density of $(D_{min}+0.1)$ were determined. The evaluation of color separation was made by a difference therebetween.

$\Delta \log E = \log Ec - \log Ey$

A smaller $\Delta \log E$ value means better color separation.

Measurement of sharpness

The apparatus used for the evaluation of color separation was used, and an image obtained by conducting scanning of one line with light of 810 nm was observed through a light microscope. The results obtained are shown in Table 2. The evaluation was made visually. A rating of ○ indicates good sharpness, and a rating of × means poor sharpness.

TABLE 2

| Sample No. | Sy 1.0 | Sc 1.0 | Δlog E | Sharpness | Remarks |
| --- | --- | --- | --- | --- | --- |
| 100 | +0.60 | 0.00 | +1.1 | X | comparison |

TABLE 2-continued

| Sample No. | Sy 1.0 | Sc 1.0 | Δlog E | Sharpness | Remarks |
|---|---|---|---|---|---|
| 101 | +0.12 | −0.60 | −0.3 | X | comparison |
| 102 | +0.10 | −0.60 | −0.3 | ○ | invention |
| 103 | −0.07 | −0.60 | −0.3 | ○ | invention |
| 104 | −0.07 | −0.60 | −0.3 | ○ | invention |

It will be understood from Table 2 that Samples 102 to 104 of the present invention are greatly improved in color separation between the cyan layer and the yellow layer in comparison with the Comparative Sample 100, and the samples of the present invention are improved in sharpness in comparison with both of the comparative samples.

According to the present invention, a dye diffusion transfer type heat developable color light-sensitive material is provided which is improved in color separation and sharpness.

While the invention has been described in detail and with reference to specific embodiments thereof, it will be apparent to one skilled in the art that various changes and modifications can be made therein without departing from the spirit and scope of the present invention.

What is claimed is:

1. A dye diffusion transfer type heat developable color light-sensitive material comprising a support having thereon at least three light-sensitive layers containing, in combination, silver halide emulsions which are sensitive in different spectral regions from one another and dye providing compounds capable of releasing or forming diffusible dyes having different hues from one another, wherein the material has an exposure side which is subjected to incident light from a light source, wherein at least two layers of said at least three light-sensitive layers comprise a first light-sensitive layer containing an emulsion spectrally sensitized to a part of infrared rays and a second light-sensitive layer which is positioned on the exposure side nearer to the light source than is the first light-sensitive layer and contains an emulsion spectrally sensitized to a part of infrared rays having a wavelength shorter than that of the infrared rays applied to the emulsion of the first light-sensitive layer, and the first light-sensitive layer contains a non-transferring filter dye which absorbs at least a part of light to which the second light-sensitive layer is exposed, wherein the light-sensitive layer or layers other than the first and second light-sensitive layers can be arranged in any order, and wherein said filter dye is a cyanine dye represented by formula (A):

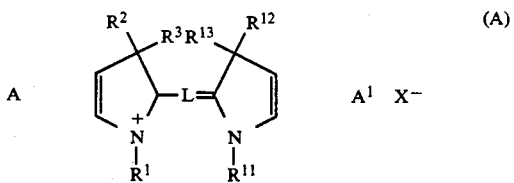

wherein A and A¹ independently represent an atomic group required for forming an unsubstituted or substituted benzene or naphthalene ring; L represents a trivalent bonding group which is formed by bonding from 5 to 7 unsubstituted or substituted methylene groups through conjugated double bonds; $R^1$ and $R^{11}$ independently represent an unsubstituted or substituted alkyl group having from 6 to 22 carbon atoms, and said substituted alkyl group contains a substituent selected from the group consisting of a halogen atom, an alkoxy group, an aryloxy group, an alkoxycarbonyl group, an acyloxy group, and an aryl group; $R^2$, $R^3$, $R^{12}$, and $R^{13}$ independently represent an alkyl group having from 1 to 22 carbon atoms; X represents an anion for neutralizing electric charge; and X can form an intramolecular salt together with A, $A^1$, $R^1$, $R^{11}$, $R^2$, $R^{12}$, $R^3$, or $R^{13}$.

2. A heat developable color light-sensitive material as in claim 1, wherein said filter dye absorbs at least 50% of light to which said second light-sensitive layer is exposed.

3. A heat developable color light-sensitive material as in claim 1, wherein said filter dye absorbs from 5 to of light to which said second light-sensitive layer is exposed.

4. A heat developable color light-sensitive material as in claim 1, wherein said support is paper.

5. A heat developable color light-sensitive material as in claim 1, wherein the at least one light-sensitive layer other than the first and second light-sensitive layers is arranged on the exposure side nearer to the light source than is the first light-sensitive layer.

6. A heat developable color light-sensitive material as in claim 1, wherein X is an anion selected from the group consisting of a halide ion, a sulfonate ion, a sulfate ion, a perchlorate ion, a hexafluorophosphate ion, and a tetrafluoroborate ion.

7. A heat developable color light-sensitive material as in claim 1, wherein A and $A^1$ each represent an unsubstituted benzene or naphthalene ring; and L is a group represented by formula (a):

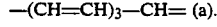

8. A heat developable color light-sensitive material as in claim 1, wherein A and $A^1$ each represent an unsubstituted benzene or naphthalene ring; and L is a group represented by formula (b):

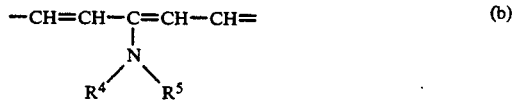

wherein $R^4$ and $R^5$ independently represent an unsubstituted or substituted alkyl or a phenyl group, or $R^4$ and $R^5$ can be combined together to form a ring.

9. A heat developable color light-sensitive material as in claim 8, wherein said ring is selected from the group consisting of a pyrazine ring, a morpholine ring, and a piperidine ring.

10. A heat developable color light-sensitive material as in claim 1, wherein A and $A^1$ each represent an unsubstituted benzene or naphthalene ring; and L is a group represented by formula (c):

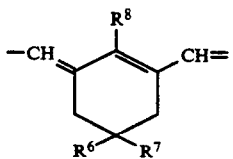

(c)

wherein $R^6$ and $R^7$ independently represent an unsubstituted or substituted alkyl group, a phenyl group, or a hydrogen atom; and $R^8$ represents a hydrogen atom or a halogen atom.

11. A heat developable color light-sensitive material as in claim 1, wherein A and $A^1$ each represent an unsubstituted benzene or naphthalene ring, and L is a group represented by formula (d):

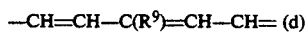

wherein $R^9$ represents an unsubstituted or substituted alkyl group, a phenyl group, a halogen atom, or a hydrogen atom.

12. A heat developable color light-sensitive as in claim 1, wherein $R^1$ and $R^{11}$ are substituted by a substituent selected from the group consisting of a halogen atom, an alkoxy group, an aryloxy group, an alkoxycarbonyl group, an acyloxy group, and an aryl group.

13. A heat developable color light-sensitive material as in claim 1, wherein $R^2$, $R^{12}$, $R^3$, and $R^{13}$ each represent a methyl group or an ethyl group.

14. A heat developable color light-sensitive material as in claim 7, wherein A and $A^1$ each represent an unsubstituted benzene ring; $R^1$ and $R^{11}$ each represent an unsubstituted or alkoxy group-substituted alkyl group from 6 to 18 carbon atoms; $R^2$, $R^{12}$, $R^3$, and $R^{13}$ each represent a methyl group; and X represents a sulfonate ion, a sulfate ion, a perchlorate ion, a hexafluorophosphate ion, or a tetrafluoroborate ion.

* * * * *